(12) United States Patent
Inakoshi et al.

(10) Patent No.: US 8,176,050 B2
(45) Date of Patent: May 8, 2012

(54) METHOD AND APPARATUS OF SUPPORTING CREATION OF CLASSIFICATION RULES

(75) Inventors: Hiroya Inakoshi, Kawasaki (JP); Kanji Uchino, Kawasaki (JP); Daigo Inoue, Kawasaki (JP); Hirokazu Hanno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 11/281,956

(22) Filed: Nov. 17, 2005

(65) Prior Publication Data

US 2007/0043690 A1 Feb. 22, 2007

(30) Foreign Application Priority Data

Aug. 19, 2005 (JP) ................ 2005-239194

(51) Int. Cl.
*G06F 7/00* (2006.01)
*G06F 17/30* (2006.01)

(52) U.S. Cl. ............................ 707/737; 707/793

(58) Field of Classification Search .............. 706/20; 707/737, 793

See application file for complete search history.

(56) References Cited

U.S. PATENT DOCUMENTS

| | | | | |
|---|---|---|---|---|
| 5,940,815 A * | 8/1999 | Maeda et al. | | 706/12 |
| 6,067,535 A * | 5/2000 | Hobson et al. | | 706/10 |
| 6,266,656 B1 * | 7/2001 | Ohno | | 706/20 |
| 6,718,333 B1 * | 4/2004 | Matsuda | | 707/102 |
| 6,842,751 B1 * | 1/2005 | Vilalta et al. | | 707/6 |
| 6,976,207 B1 * | 12/2005 | Rujan et al. | | 715/234 |
| 2002/0147694 A1 * | 10/2002 | Dempsey et al. | | 706/12 |
| 2003/0059106 A1 * | 3/2003 | Gutta | | 382/158 |
| 2004/0002776 A1 * | 1/2004 | Bickford | | 700/30 |
| 2004/0093316 A1 * | 5/2004 | Howard et al. | | 706/25 |

FOREIGN PATENT DOCUMENTS

| | | |
|---|---|---|
| JP | 2002-157262 | 5/2002 |
| JP | 2002-202984 A | 7/2002 |
| WO | WO-2004/019264 | 3/2004 |

OTHER PUBLICATIONS

Japanese Office Action mailed Apr. 9, 2009 for corresponding Japanese Application No. 2005-239194. (a partial English-language translation is provided.).

Li, Jinyan et al., "The space of jumping emerging patterns and its incremental maintenance algorithms", *In Proceedings of the Seventeenth International Conference on Machine Learning*, Morgan Kaufmann 2000, p. 551-558.

\* cited by examiner

*Primary Examiner* — Angela M Lie
*Assistant Examiner* — Kris Mackes
(74) *Attorney, Agent, or Firm* — Fujitsu Patent Center

(57) ABSTRACT

This invention is to appropriately support creation of a classification rule for a new data item. This method includes: storing a new data item and a category of the new data item into a storage; extracting feature patterns each including a condition including a feature element of the new data item stored in the storage and a corresponding category from data stored in a correct answer data storage, which stores data items and categories of the data items, and storing the feature patterns into a feature pattern storage; and grouping the feature patterns stored in the feature pattern storage into a first set whose feature pattern matches with the category of the new data item stored in the storage and a second set whose feature pattern does not match with the category of the new data item, and storing a grouping result into a group data storage. Accordingly, the feature pattern, which is a candidate of the classification rule, is automatically generated, and furthermore, it becomes possible to select a specific feature pattern as a classification rule to be applied hereinafter from the first set.

10 Claims, 14 Drawing Sheets

| PRODUCT NAME | CATEGORY |
|---|---|
| OIL ROSE BULGARIA | AROMA |
| DIPTYQUE CANDLE ROSE | AROMA |
| ESSENTIAL OIL ROSEWOOD | AROMA |
| WOOD SOFA (SINGLE) | BENCH AND CHAIR |
| EXTRA-SESAME OIL | SEASONING |
| ROSE WINE AND BOUQUET INCLUDING 10 ROSES | BOUQUET/BLOOM |
| ⋮ | ⋮ |

| CONDITION PART | | CONCLUDING PART(CATEGORY) |
|---|---|---|
| "BULGARIA" | ⇒ | AROMA |
| "WOOD""OIL" | ⇒ | AROMA |
| "FLOWER""ROSE" | ⇒ | BOUQUET/BLOOM |
| "BLOOM""ROSE" | ⇒ | BOUQUET/BLOOM |
| ⋮ | | ⋮ |

FIG.3

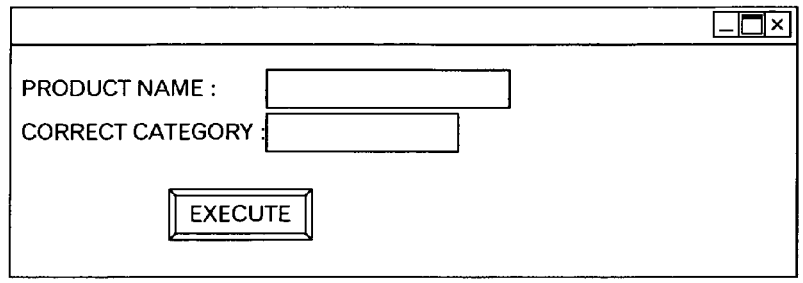

FIG.5

| CLASS P | | | | CLASS N | | | |
|---|---|---|---|---|---|---|---|
| OUTLOOK | TEMP. | HUMIDITY | WINDY | OUTLOOK | TEMP. | HUMIDITY | WINDY |
| OVERCAST | HOT | *HIGH* | FALSE | *SUNNY* | *HOT* | *HIGH* | *FALSE* |
| RAIN | *MILD* | *HIGH* | FALSE | *SUNNY* | *HOT* | *HIGH* | *TRUE* |
| RAIN | COOL | NORMAL | FALSE | RAIN | COOL | NORMAL | *TRUE* |
| OVERCAST | COOL | NORMAL | *TRUE* | *SUNNY* | *MILD* | *HIGH* | *FALSE* |
| *SUNNY* | COOL | NORMAL | FALSE | RAIN | *MILD* | HIGH | TRUE |
| RAIN | *MILD* | NORMAL | FALSE | | | | |
| *SUNNY* | *MILD* | *NORMAL* | *TRUE* | | | | |
| OVERCAST | *MILD* | *HIGH* | *TRUE* | | | | |
| OVERCAST | HOT | NORMAL | FALSE | | | | |

FIG.6

| CLASSIFICATION RULE (L⇒R) | CONSISTENT PATTERN (T_{L⇒R}) | CONTRARY PATTERN (F_{L⇒R}) |
|---|---|---|
| φ | φ | "JAM""SMELL"⇒JAM |
|  |  | "JAM""ROSE"⇒JAM |
|  |  | "YOU""BLOOM"⇒JAM |
|  |  | "YOU""JAM"⇒JAM |
|  |  | "JAM""BLOOM"⇒JAM |
|  |  | "YOU""SMELL"⇒JAM |
|  |  | "JAM""SMELL"⇒JAM |
| "BULGARIA"⇒AROMA | "OIL""BULGARIA"⇒AROMA | "JAM""BULGARIA"⇒JAM |
|  |  | "BULGARIA""SMELL"⇒JAM |
|  |  | "YOU""BULGARIA"⇒JAM |
|  |  | "BLOOM""BULGARIA"⇒JAM |
| "BLOOM""ROSE"⇒BOUQUET/BLOOM | "BLOOM""PINK""ROSE"⇒BOUQUET/BLOOM | "BLOOM""ROSE""SMELL"⇒JAM |

FIG.9

| CLASSIFICATION RULE (L⇒R) | CONSISTENT PATTERN (T_{L⇒R}) | CONTRARY PATTERN (F_{L⇒R}) |
|---|---|---|
| φ | φ | "VOCABULARY"⇒EDUCATION |
| | | "MASUDA"⇒EDUCATION |
| | | "METHOD"⇒EDUCATION |
| "LEARNING"⇒ DICTIONARY/TRANSLATION | "ENGLISH""LEARNING"⇒DICTIONARY/TRANSLATION | "ENGLISH CONVERSATION""LEARNING"⇒ EDUCATION |
| | "LEARNING""ELECTRONIC"⇒DICTIONARY/TRANSLATION | |
| | "SYSTEM""LEARNING"⇒DICTIONARY/TRANSLATION | |
| | "SET""LEARNING"⇒DICTIONARY/TRANSLATION | |
| | "LEARNING""DICTIONARY"⇒DICTIONARY/TRANSLATION | |

FIG.10

METHOD AND APPARATUS OF SUPPORTING CREATION OF CLASSIFICATION RULES

TECHNICAL FIELD OF THE INVENTION

The present invention relates to a method of supporting a creation of a classification rule corresponding to data items.

BACKGROUND OF THE INVENTION

Conventionally, when classifying data items in accordance with classification rules created by a user, there have been problems as follows:

(1) Addition and/or Modification of Rules When Data is Added

Generally, data items to be classified are added one after another. In such a case, because the data items to be added cannot be classified according to only the classification rules, which has been created in advance, adding new rules and/or modifying the existing rules is needed at any time. However, it is not easy to create effective classification rules.

(2) Consistency Between the Classification Rules and Classified Data Items

In a case that the data items are classified into a category, which is different from a former category, because of the addition and/or modification of the rule, it is said that the rule is inconsistent with the classified data item and the rule is called as an inconsistent rule. In a directory type search service, which classifies the data items according to a predefined category tree, it is desired to have a means to guarantee that the classification results before and after updating the rule base are identical. In order to resolve the problem, it is verified whether or not the already classified data item is classified into the same category as the formerly identified category according to the added and/or modified rule, that is, there is no inconsistency. If there is inconsistency, the added and/or modified rule is modified repeatedly until the inconsistency disappears. It costs a lot for the verification, and it is desired to develop a technique for automatically generating a rule without the inconsistency.

(3) Consistency Between Classification Rules

There is a case where an already-known data item is classified into different categories according to the added and/or modified rule and other rules, that is, a case where conflicting rules are created. For example, according to a first rule that "if P AND Q are satisfied, it is classified into C1" and a second rule that "if P and R are satisfied, it is classified into C2", a data item satisfying "P, Q, and R" is classified into C1 and C2, respectively. If C1 is different from C2, the first rule and the second rule are the conflicting rules. Because a rule base should finally classify each data item in to a single category, when a conflict occurs, a means to resolve the conflict is needed. Accordingly, a method (first matching method) is well known in which the evaluation orders of rules are determined in advance and then the category of a classifying destination is determined using a firstly matched rule. However, if plural conflicting rules exist, the category of the classifying destination is strongly influenced by the application order of the rule so that it is difficult to determine the validity of each individual rule. Therefore, it is important to prevent the creation of the conflicting rules, but generally it is difficult to be carried out.

Incidentally, for example, JP-A-2002-157262 discloses a technique for presenting a user with information to evaluate the validity of a classification rule that the user would like to register in a case that a classification system is objective and complicated. More specifically, in a method of supporting the definition of classification rules in a document classification system for classifying electronic documents into categories based on the classification rules, by applying a classification rule input by the user through an input device to plural classified electronic documents, a reliability degree of the applied classification rule and a contribution degree to the improvement or the maintenance of classification accuracy are calculated, and the calculation results is notified to the user through an output device. However, the system does not have a function for generating candidates of the classification rules. Accordingly, the user has to master the classification system and features of the electronic documents, and it is difficult for unskillful users to create the classification rule. In addition, only taking into account newly created rules may cause the conflict with the existing rules. However, this publication does not care about this problem.

As described above, according to the background art, it is difficult to generate an appropriate classification rule for new data items, and to resolve the conflict with the existing classification rules.

SUMMARY OF THE INVENTION

Accordingly, an object of the present invention is to provide a method of supporting appropriate creation of classification rules for new data items.

A method of supporting creation of a classification rule according to the present invention includes: storing a new data item and a category of the new data item into a storage; extracting feature patterns each including a condition including a feature element of the new data item stored in the storage and a corresponding category from data stored in a correct answer data storage, which stores data items and categories of the data items, and storing the feature patterns into a feature pattern storage; and grouping the feature patterns stored in the feature pattern storage into a first set whose feature pattern matches with the category of the new data item stored in the storage and a second set whose feature pattern does not match with the category of the new data item, and storing a grouping result into a group data storage.

Accordingly, the feature pattern, which is a candidate of the classification rule, is automatically generated, and furthermore, it becomes possible to select a specific feature pattern as a classification rule to be applied hereinafter from the first set.

In addition, the method according to the present invention may include: extracting a classification rule whose condition part satisfies the new data item stored in the storage from a classification rule storage, which stores classification rules each being composed of a condition part for the data item and a corresponding category, and storing the extracted classification rule into an extracted classification rule storage. Moreover, the first set may have a first group and a second group. The first group may be a group of the feature patterns stored in the feature pattern storage, which respectively include a first specific condition and a category matching with the category of the new data item stored in the storage. The extracted classification rule storage may store the classification rules satisfying the first specific condition. The second group may be a group of the feature patterns, which are not included in any one of the first groups. Furthermore, the second set may include a third group of the feature patterns stored in the feature pattern storage, which respectively include a second specific condition and a category that is different from the category of the new data item stored in the storage. The extracted classification rule storage may store the classification rules satisfying the second specific condition. Accordingly, the property and relation of the feature pattern, the relation with the classification rules stored in the classification rule storage and the like can be presented in an arranged form. Moreover, by such presentation, the conflict can also be resolved.

Furthermore, the aforementioned grouping may include generating a fourth group of the classification rules, which are stored in the extracted classification rule storage and correspond to the first group.

In addition, the method according to the invention may further include: if the number of feature patterns included in the first group satisfies a condition concerning the number of feature patterns included in the third group associated with the first group; changing the condition of the feature pattern included in the first group to a condition including a negative rule; and if the number of feature patterns included in the third group satisfies a condition concerning the number of feature patterns included in the first group associated with the third group, changing the condition of the feature pattern included in the third group to a condition including a negative rule. By carrying out such a processing, the number of rules decreases and the rule base, which the user can easily understand, can be constructed. Incidentally, the effectiveness of the rules simplified by the negation, in which its condition part satisfies a data item (e.g. product data) added in future, is expected during the future.

Furthermore, the method according to the present invention may further include: calculating a score of a feature pattern based on feature elements for each of the feature patterns included in the first set, the second set, and a third set excluding the classification rules included in the fourth group from all classification rules stored in the extracted classification rule storage, and storing the score into a group data storage in association with the feature pattern. Accordingly, a priority degree to present to the user or a priority degree to adopt as the classification rule can be determined.

In addition, the method according to the present invention may further include: presenting a user with the feature patterns included in the first set; accepting designation of the feature pattern from the user; storing the designated feature pattern into the classification rule storage; identifying a third group associated with the first group including the designated feature pattern, and storing the feature pattern included in the third group into the classification rule storage; and identifying a fourth group corresponding to the first group including the designated feature pattern, and removing the classification rule included in the fourth group from the classification rule storage. Accordingly, the classification rule storage can be properly updated.

Furthermore, the method according to the present invention may further include: registering the feature patterns stored in the group data storage into the classification rule storage as a new classification rule in descending order of the scores of the feature patterns, which are stored in the group data storage, until the error rate which changes according to the number of occurrences of misclassification for the data items stored in a correct answer data storage and for which an equation is defined in advance, increases. Accordingly, the new classification rule can be automatically generated.

It is possible to create a program for causing a computer to execute the aforementioned method according to this invention, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

BRIEF DESCRIPTION OF THE DRAWINGS

FIG. 3 is diagram showing an example of data stored in a classification rule DB;

FIG. 5 is a diagram showing an example of an input screen for new product data;

FIG. 6 is a diagram to explain an emerging pattern;

FIG. 9 is a diagram showing a first example of a conflict resolution table;

FIG. 10 is a diagram showing a second example of the conflict resolution table;

DETAILED DESCRIPTION OF THE PREFERRED EMBODIMENTS

Figures 1, 2:
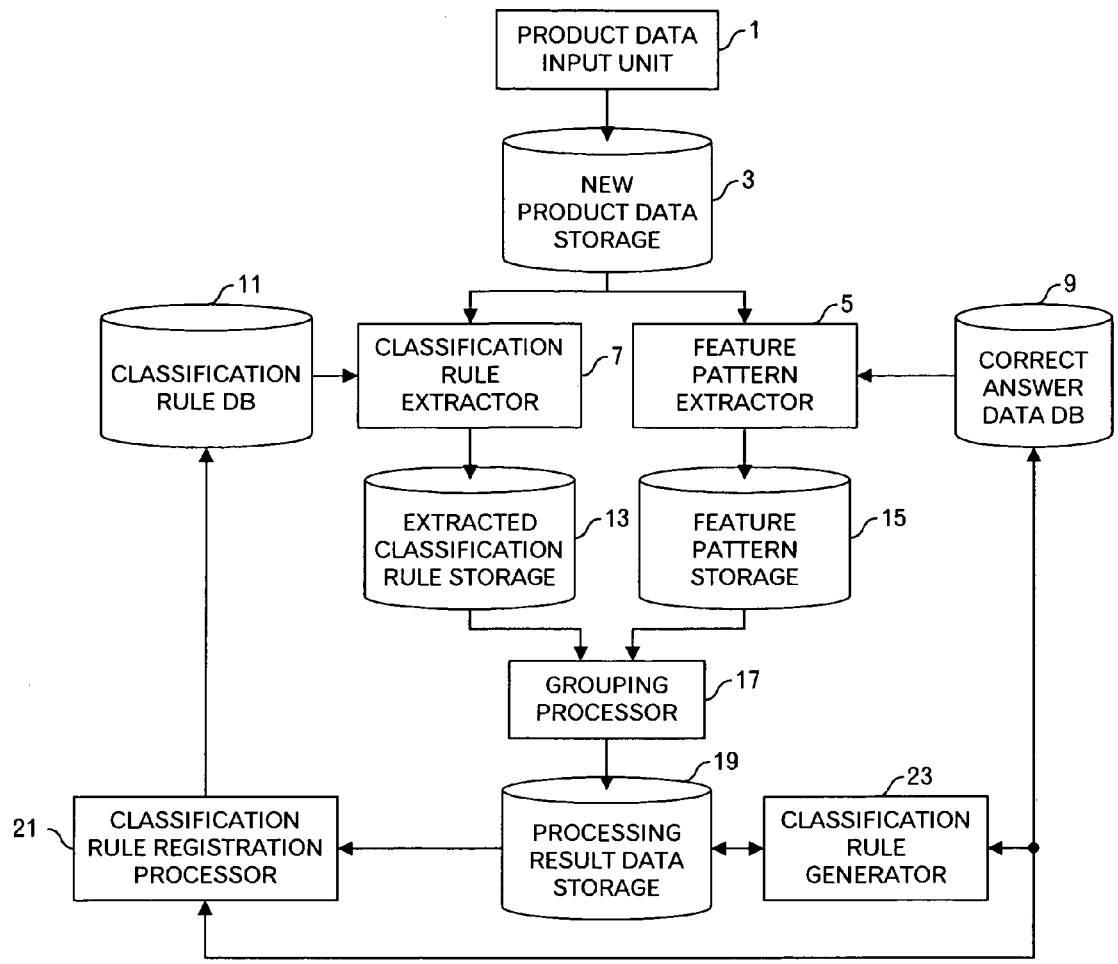
FIG. 1 is a block diagram of an embodiment of the present invention.
FIG. 2 is a diagram showing an example of data stored in a correct answer data DB.

FIG. 1 is a block diagram of an apparatus for supporting creation of classification rules according to an embodiment of the present invention. This embodiment shows an example in which product data is treated as product data. However, the data items are not limited to the product data. The apparatus for supporting creation of a classification rule includes a product data input unit 1 for receiving inputs of a pair of a product name and a correct category of a new product from a user, a new product data storage 3 for storing the inputted data, a correct answer data DB 9 in which a pair of previously input product name and classification data (category) are registered, a feature pattern extractor 5 for generating feature patterns, which will be described below, using the data stored in the new product data storage 3 and the correct answer data DB 9, a feature pattern storage 15 for storing data of the feature patterns generated by the feature pattern extractor 5, a classification rule DB 11 for storing data of the existing classification rules, a classification rule extractor 7 for extracting the classification rules associated with the new product by using the data stored in the new product data storage 3 and the classification rule DB 11, an extracted classification rule storage 13 for storing the data of the classification rules extracted by the classification rule extractor 7, a grouping processor 17 for generating a conflict resolution table and carrying out other processing, using the data stored in the feature pattern storage 15 and the extracted classification rule storage 13, a processing result data storage 19 for storing the conflict resolution table, which is a result generated by the grouping processor 17 and the like, a classification rule generator 23 for carrying out negation of condition for a condition part of the classification rule, calculation of scores, and other processing, using the data stored in the processing result data storage 19 and the correct answer data DB 9, and a classification rule registration processor 21 for carrying out registration into the classification rule DB 11 and other processing, using the data stored in the processing result data storage 19 and the correct answer data DB 9.

FIG. 2 shows an example of data stored in the correct answer data DB 9. In an example of FIG. 2, categories are registered in association with respective product names. The product name may be a product name such as a catch phrase as well as a simple name of the product. The categories respectively include a name and a category code (not shown) of a pertinent node in a predetermined category tree.

FIG. 3 shows an example of data stored in the classification rule DB 11. In an example of FIG. 3, a concluding part (category) is registered in association with a condition part. The condition part includes a condition composed of one keyword, a condition which is constructed by combining plural keywords using an AND, and the like. A space located between the plural keywords indicates the AND. In addition, by using plural ANDs, a rule having an OR combination can be represented. Incidentally, as for the keyword, negation, that is, "¬" (NOT) may be included.

Figure 4:
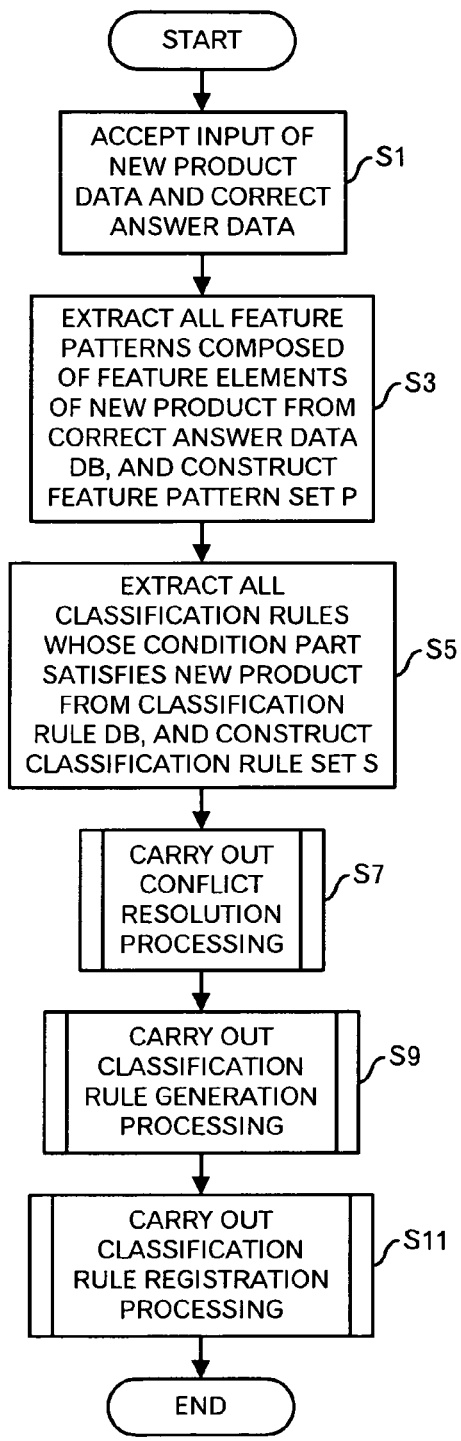
FIG. 4 is a diagram showing a flow chart of a main processing according to an embodiment of the present invention.

Next, with reference to FIG. 4 to FIG. 17, a processing carried out by the apparatus for supporting creation of classification rules, shown in FIG. 1, will be explained. At first, the product data input unit 1 of the apparatus for supporting creation of the classification rule prompts a user to input a product name and a correct category of a new product, accepts the input of the product name and the correct category of the new product from the user to store input data into the new product data storage 3 (FIG. 4: step S1). For example, a screen as shown in FIG. 5 is displayed to prompt the user to input data. In a screen example shown in FIG. 5, an input column for the product name, an input column for the correct category, and an "execute" button are provided. When the user inputs data into these input columns and clicks the "execute" button, the following processing is carried out. In an embodiment of the present invention, the new product is input on a case-by-case basis.

Next, the feature pattern extractor 5 extracts all feature patterns composed of feature elements of the product name of the new product, which is stored in the new product data storage 3, from the correct answer data DB 9, constructs a feature pattern set P, and stores the feature pattern set P into the feature pattern storage 15 (step S3). The feature pattern is, for example, an emerging pattern. The emerging pattern is a pattern whose occurrence frequencies notably change between categories. For example, the feature elements are extracted by analyzing a morpheme or a separating processing of a word or phrase. As shown in FIG. 6, a class P includes nine records and a class N includes five records. In an example of FIG. 6, weather data such as outlook, temperature, humidity, and windy is treated. The outlook is one of overcast, rain, and sunny. The temperature is one of hot, mild, and cool. The humidity is one of high, low, and normal. The windy is true or false. In this case, the emerging patterns, which are composed of the feature elements {sunny, mild, high, true} are extracted from the data of FIG. 6, are as follows: "sunny" "mild" "true"=>P, "sunny" "high"=>N, "sunny" "mild" "high"=>N, and "sunny" "high" "true"=>N. Incidentally, as for a detailed extracting method of the emerging pattern, please refer to "The Space of Jumping Emerging Patterns and Its Incremental Maintenance Algorithm", Jinyan Li, et al., Int'l Conf. on Machine Learning 2000, pp 551-558, "DeEPs: A New Instance-based Discovery and Classification System", Jinyan Li, et al., Jul. 16, 2001, Machine Learning Vol. 54. No. 2, pp. 99-124, which is incorporation herein by reference, and so on.

An idea to support an updating operation of a rule base by using such an emerging pattern did not exist up to this time, and candidates of the classification rules, which are difficult for even a specialist, can be generated automatically.

For example, in a case that a product name of a new product is "Rose Jam from Bulgaria—Sweet Smell and taste of Bloom for You", "Bulgaria", "Rose", "Jam", "Bloom", "Taste", "Smell", and 'You' are extracted as feature elements. Then, it is supposed that following feature patterns are extracted from the correct answer data DB 9: a feature pattern composed of keywords "Oil" AND "Bulgaria" and a correct category "aroma", a feature pattern composed of keywords "Jam" AND "Smell" and a correct category "Jam", a feature pattern composed of keywords "Jam" AND "Rose" and a correct category "Jam", a feature pattern composed of keywords "You" AND "Bloom" and a correct category "Jam", a feature pattern composed of keywords "You" AND "Jam" and a correct category "Jam", a feature pattern composed of keywords "Jam" AND "Bloom" and a correct category "Jam", a feature pattern composed of keywords "You" AND "Smell" and a correct category "Jam", a feature pattern composed of keywords "Jam" AND "Smell" and a correct category "Jam", a feature pattern composed of keywords "Jam" AND "Bulgaria" and a correct category "Jam", a feature pattern composed of keywords "Bulgaria" AND "Smell" and a correct category "Jam", a feature pattern composed of keywords "You" AND "Bulgaria" and a correct category "Jam", a feature pattern composed of keywords "Bloom" AND "Bulgaria" and a correct category "Jam", a feature pattern composed of keywords "Bloom", "Pink" AND "Rose" and a correct category "Banquet/Bloom", and a feature pattern composed of keywords "Bloom", "rose" AND "Smell" and a correct category "Jam".

In a case that a product name of a new product is "Other English Conversation/Vocabulary, Masuda's Learning Method, You can easily memorize English words", "English conversation", "Vocabulary", "Learning", "English words", and "Masuda" are extracted as the feature elements. Then, it is supposed that following feature patterns are extracted from the correct answer data DB 9: a feature pattern composed of keywords "English" AND "Learning" and a correct category "Dictionary/Translation", a feature pattern composed of keywords "Learning" AND "Electronic" and a correct category "Dictionary/Translation", a feature pattern composed of keywords "system" AND "Learning" and a correct category "Dictionary/Translation", a feature pattern composed of keywords "Set" AND "Learning" and a correct category "Dictionary/Translation", a feature pattern composed of keywords "Learning" AND "Dictionary" and a correct category "Dictionary/Translation", a feature pattern composed of a keyword "Vocabulary" and a correct category "Education", a feature pattern composed of a keyword "Masuda" and a correct category "Education", a feature pattern composed of a keyword "Method" and a correct category "Education", and a feature pattern composed of keywords "English conversation" and "Learning" and a correct category "Education".

Then, the classification rule extractor 7 extracts all classification rules whose condition part satisfies the product name of the new product stored in the new product data storage 3 from the classification rule DB 11, constructs a classification rule set S, and stores the classification rule set S into the extracted classification rule storage 13 (step S5). By applying the all classification rules registered in the classification rule DB 11 to the product name of the new product, if the condition part of the classification rule satisfies the product name of the new product, the classification set S is constructed by using the classification rule.

For example, in the case that the product name of the new product is "Rose Jam from Bulgaria—Sweet Smell and Taste of Bloom for You", it is supposed that a classification rule including a condition part "Bulgaria" and a concluding part "Aroma", and a classification rule including a condition part "Bloom" AND (^) "Rose" and a concluding part "Banquet/Bloom" are extracted.

Also, in the case that the product name of the new product is "Other English Conversation/Vocabulary, Masuda's Learning Method, You can easily memorize English words", it is supposed that a classification rule including a condition part "English Vocabulary" and a concluding part "Education" and a classification rule including a condition part "Learning" and a conclusion part "Dictionary/Translation" are extracted.

Then, the grouping processor 17 carries out a conflict resolution processing using the data stored in the extracted classification rule storage 13 and the feature pattern storage 15 (step S7). The conflict resolution processing will be described using FIG. 7 to FIG. 10. This conflict resolution processing is carried out in order to make the user easily understand the conflict state of the classification rules by generating the conflict resolution table. The grouping processor 17 extracts a feature pattern p=>c (p is a set of one or plural keywords, and c is a correct category) from the feature pattern set P stored in the feature pattern storage 15 (step S21). For example, in the first example described above, it is supposed that the feature pattern composed of the keywords "Jam" AND "Bulgaria" and the correct category "Jam" is extracted.

Accordingly, the grouping processor 17 extracts a subset S (p) of the classification rule set S, which is composed of the classification rules satisfying the pattern P of the feature pattern p=>c, and stores data of the subset S (p) into the processing result data storage 19 (step S23). In the case that the feature pattern composed of the keywords "Jam" AND "Bulgaria" and the correct category "Jam" is extracted in the aforementioned first example, the classification rule including a condition part "Bulgaria" and a concluding part "Aroma" is extracted as the subset S (p). Incidentally, the definition of the satisfaction will be described using FIG. 8.

Figure 8:
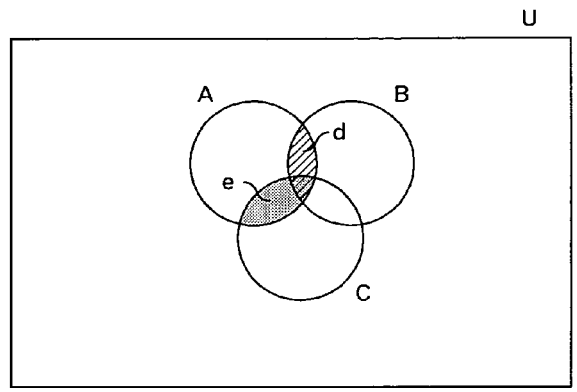
FIG. 8 is a diagram to explain definition of satisfaction.

In FIG. 8, an outmost rectangle indicates the entire U including all products, a circle at the left side indicates a set A of the products whose product name includes "Bulgaria", a circle at the right side indicates a set B of the products whose product name includes "Jam", and a circle below indicates a set C of the products whose product name includes "Rose". In addition, there are mutual overlaps among the circles corresponding to the sets A to C. When it is supposed that a portion of the circle corresponding to the set A, which is overlapped with the circle corresponding to the set B, is a region d, the products included in the region d are in a group of products whose product name satisfies a condition "Bulgaria" AND "Jam". The region d is included in the circle corresponding to the set A. On the figures as shown in FIG. 8, if a region (the circle corresponding to the set A in this example) corresponding to a condition part of the classification rule includes a region corresponding to the pattern p (the region d in this example), it is referred to "satisfied".

In addition, it is supposed that the classification rule is "Bulgaria" AND "¬rose" =>"Aroma" and the feature pattern is "Jam" AND "Bulgaria"=>"Jam". A set of products satisfying the condition "Jam" and "Bulgaria" corresponds to the region d as described above. On the contrary, a set of the products satisfying a condition "Bulgaria" AND "¬rose" corresponds to a region in which a region e is removed from the circle corresponding to the set A. That is, it corresponds to a region in which an overlapped region of the circle corresponding to the set A and the circle corresponding to the set C is removed from the circle corresponding to the set A. The region in which the region e is removed from the circle corresponding to the set A does not always include the region d corresponding to the pattern p. Accordingly, it cannot be said that the condition part of the classification rule "Bulgaria" AND "¬rose"=>"Aroma" "satisfies" the pattern p.

The grouping processor 17 determines whether the subset S (p) is null (step S25). In a case where the subset S (p) is null, it adds the pattern p=>c extracted at the step S21 a set $F_\Phi$ (step S27). In the aforementioned first example, in the case that the feature pattern composed of keywords "Jam" AND "Smell" and the correct category "Jam" is extracted at the step S21, because any classification rule satisfying the pattern p of the feature pattern does not exist, the feature pattern composed of keywords "Jam" and "Smell" and the correct category "Jam" is added to the set $F_\Phi$. Data of the set $F_\Phi$ is stored into the processing result data storage 19. Then, the processing shifts to step S33.

On the contrary, in the case that the subset S (p) is not null, the grouping processor 17 extracts one classification rule L=>R from the subset S (p) of the classification rule (step S29). In the example described above, the classification rule including the condition part "Bulgaria" and the concluding part "Aroma" is extracted. Then, in the case where a correct category c of the feature pattern p=>c coincides with a concluding part R of the classification rule L=>R, it adds the feature pattern p=>c extracted at the step S21 to a set $T_{L=>R}$. In the case where the correct category c of the feature pattern p=>c does not coincide with the concluding part R of the classification rule L=>R, it adds the feature pattern p=>c to a set $F_{L=>R}$ (step S31). In the example described above, because the concluding part of the classification rule is "Aroma" but the correct category of the feature pattern is "Jam", "c≠R" is satisfied. Accordingly, the feature pattern p=>c is added to the set $F_{L=>R}$. Incidentally, in a case where the feature pattern p=>c is the feature pattern composed of the keywords "Oil" AND "Bulgaria" and the correct category "Aroma", "c=R" is satisfied. Accordingly, the feature pattern p=>c is added to the set $T_{L=>R}$. The data of the sets $F_{L=>R}$ and $T_{L=>R}$ is stored into the processing result data storage 19.

Figure 7:
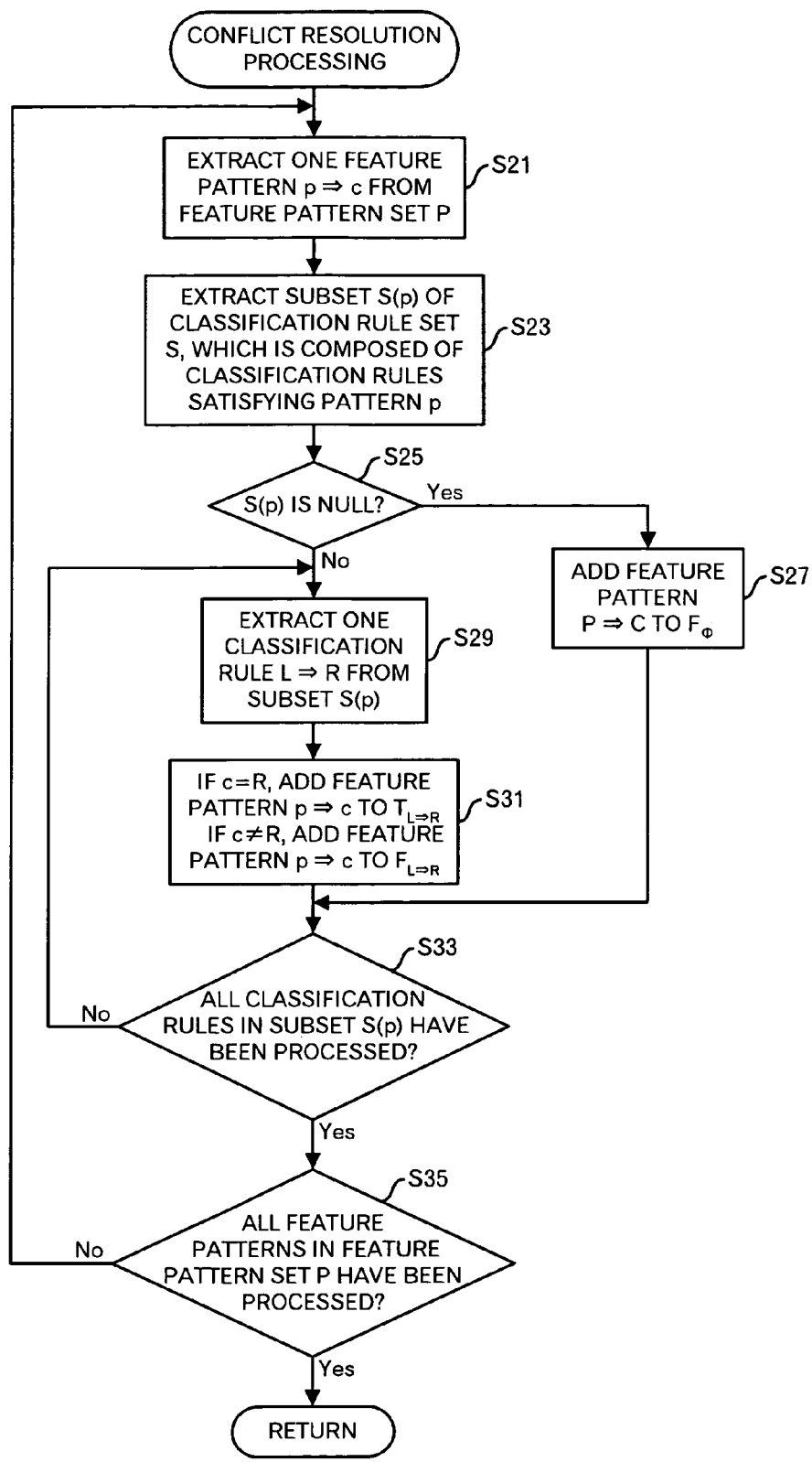
FIG. 7 is a diagram showing a flow chart of a conflict resolving processing.

Returning to the explanation of FIG. 7, it is determined whether or not all the classification rules in the subset S (p) have been processed (step S33). In a case where there is an unprocessed classification rule, the processing returns to the step S29. In the case that all the classification rules of the subset S (p) have been processed, it is determined whether or not all the feature patterns of the feature pattern set P have been processed (step S35). In a case where there is an unprocessed feature pattern in the feature pattern set P, the processing returns to the step S21.

By carrying out such a processing, as for the first example, a conflict resolution table shown in FIG. 9 is generated. In an example of FIG. 9, the set $F_\Phi$ includes a feature pattern composed of keywords "Jam" AND "Smell" and a correct category "Jam", a feature pattern composed of keywords "Jam" AND "Rose" and a correct category "Jam", a feature pattern composed of keywords "You" AND "Bloom" and a correct category "Jam", a feature pattern composed of keywords "Jam" AND "Jam" and a correct category "Jam", a feature pattern composed of keywords "Jam" and "Bloom" and a correct category "Jam", a feature pattern composed of keywords "You" AND "Smell" and a correct category "Jam", and a feature pattern composed of keywords "Jam" AND "Smell" and a correct category "Jam". A set $T_{Bulgaria=>Aroma}$ corresponding to the classification rule whose condition part (L) is "Bulgaria" and whose concluding part (R) is "Aroma" includes a feature pattern composed of keywords "Oil" AND "Bulgaria" and a correct category "Aroma". Further, A set $F_{Bulgaria=>Aroma}$ corresponding to the classification rule "Bulgaria"=>"Aroma" includes a feature pattern composed of keywords "Jam" AND "Bulgaria" and a correct category "Jam", a feature pattern composed of keyword "Bulgaria" AND "Smell" and a correct category "Jam", a feature pattern composed of keywords "You" AND "Bulgaria" and a correct category "Jam", and a feature pattern composed of keywords "Bloom" AND "Bulgaria" and a correct category "Jam". Furthermore, a set $T_{Bloom\ Rose=>Banquet/Bloom}$ corresponding to a classification rule whose condition part (L) is "Bloom" and "Rose" and whose concluding part (R) is "Banquet/Bloom" includes a feature pattern composed of keywords "Bloom", "Pink", AND "Rose" and a correct category "Banquet/Bloom". Moreover, a set $F_{Bloom\ Rose=>Banquet/Bloom}$ corresponding to a classification rule "Bloom", "Rose"=>"Banquet/Bloom" includes a feature pattern composed of keywords "Bloom", "Rose", AND "Smell" and a correct category "Jam".

As for the second example described above, a conflict resolution table as shown in FIG. 10 is generated. In an example of FIG. 10, the set $F_\Phi$ includes a feature pattern composed of a keyword "Vocabulary" and a correct category "Education", a feature pattern composed of a keyword "Masuda" and a correct category "Education", and a feature pattern composed of a keyword "Method" and a correct category "Education". A set $T_{Learning=>Dictionary/Translation}$ corresponding to a classification rule whose condition part (L) is "Learning" and concluding part (R) is "Dictionary/Translation" includes a feature pattern composed of keywords "English" AND "Learning" and a correct category "Dictionary/Translation", a feature pattern composed of keywords "Learning" AND "Electronic" and a correct category "Dictionary/Translation", a feature pattern composed of keywords "System" AND "Learning" and a correct category "Dictionary/Translation", a feature pattern composed of keywords "Set" AND "Learning" and a correct category "Dictionary/Translation", and a feature pattern composed of keywords "Learning" AND "Dictionary" and a correct category "Dictionary/Translation". Further, a set $F_{Learning=>Dictionary/Translation}$ corresponding to the classification rule "Learning"=>"Dictionary/Translation" includes a feature pattern composed of keywords "English conversation" AND "Learning" and a correct category "Education".

In such a conflict resolution table, a classification rule L=>R and the corresponding set $F_{L=>R}$ in a column of a contrary pattern are conflict rules each other. In a case where both of them are stored in the classification rule DB 11, misclassification occurs when the priority is not set for the classification rules. However, in a case where the corresponding set $T_{L=>R}$ in a column of a consistent pattern is selected on behalf of the classification rule L=>R, the conflict is resolved.

A conflicting state of the classification rules can be displayed by presenting the conflict resolution table shown in FIG. 9 or FIG. 10 to a user. After understanding the aforementioned meanings of the table, the user can instructs following operations: selecting an appropriate feature pattern, for example, in the contrary pattern to add the selected feature pattern to the classification rule DB 11, further selecting a corresponding feature pattern in the column of the consistent pattern to add the selected feature pattern to the classification rule DB 11, and further excluding a corresponding classification rule in a column of the classification rules from the classification rule DB 11. Additionally, other instructions necessary to resolve the conflict can also be carried out.

Incidentally, even by classifying the feature patterns included in the column of the contrary pattern into a first set, and classifying the feature patterns included in the column of the consistent pattern into a second set, it becomes possible to instruct to add the feature patterns to the classification rule DB 11 after understanding properties of the feature patterns.

Returning to the explanation of FIG. 4, the classification rule generator 23 carries out a classification rule generation processing using the data stored in the processing result data storage 19 (step S9). This processing will be described in detail using FIG. 11 and FIG. 12.

The first classification rule generation processing will be described with FIG. 11. The classification rule generator 23 identifies one classification rule L=>R based on the data stored in the processing result data storage 19 (step S41). Then, it identifies feature patterns included in a set $T_{L=>R}$ and a set $F_{L=>R}$ corresponding to the identified classification rule L=>R in the processing result data storage 19 and determines whether or not $|T_{L=>R}|<<|F_{L=>R}|$ is satisfied (step S43). $|T_{L=>R}|$ represents the number of the feature patterns included in the set $T_{L=>R}$, and $|F_{L=>R}|$ represents the number of the feature patterns included in the set $F_{L=>R}$. For example, a threshold is set in advance, and it is determined whether or not the difference between $|T_{L=>R}|$ and $|F_{L=>R}|$ is equal to or greater than the threshold.

In a case where the condition of $|T_{L=>R}|<<|F_{L=>R}|$ is satisfied, the classification rule generator 23 carries out the negation of the rule for the set $F_{L=>R}$ (step S45). For example, when a classification rule L=>R whose condition part (L) is "Bulgaria" and the concluding part (R) is "Aroma" is processed, the number of the feature patterns $|F_{L=>R}|$ of the corresponding set $F_{L=>R}$ is 4. In addition, because the number of the feature patterns $|T_{L=>R}|$ of the corresponding set $T_{L=>R}$ is 1, it is supposed that the condition at the step S43 is satisfied. Accordingly, the negation of the rule is carried out for the feature pattern composed of keywords "Jam" AND "Bulgaria" and a correct category "Jam", the feature pattern composed of keywords "Bulgaria" AND "Smell" and a correct category "Jam", the feature pattern composed of keywords "You" AND "Bulgaria" and a correct category "Jam", and the feature pattern composed of keywords "Bloom" AND "Bulgaria" and a correct category "Jam". Here, the keyword "Bulgaria" is in common but another keyword is different each other. However, because the corresponding set $T_{L=>R}$ includes the feature pattern composed of keywords "Oil" AND "Bulgaria" and a correct category "Aroma", if "Oil" is used for the product name, the correct category becomes "Aroma". Therefore, if the feature pattern includes "Bulgaria", but does not include "Oil", the classification rule cannot be adopted without conflict. At this step S45, the feature pattern composed of keywords "Bulgaria" AND "¬Oil" and a correct category "Jam" is generated using the negation of the 'Oil' included in the feature pattern of the set $T_{L=>R}$. Although the set $F_{Bulgaria=>Aroma}$ shown in FIG. 9 includes the four feature patterns, the set $F_{Bulgaria=>Aroma}$ is replaced with a feature pattern set newly generated by the negation of the rule.

By carrying out this negation of the rule, the number of rules is decreased. Accordingly, a rule base which is easily understandable to people can be constructed. Also, by the negation of the rule, it is expected that the condition part is more likely to satisfy the product data being added in future, and it is also expected that the effectiveness in future is improved.

On the other hand, in a case where the condition of $|T_{L=>R}|<<|F_{L=>R}|$ is not satisfied, the processing shifts to step S47. After the step S45, or, in the case that the aforementioned condition is not satisfied at the step S43, the classification rule generator 23 judges whether or not the processing for all the classification rules L=>R is completed (step S47). If there is an unprocessed classification rule, the processing returns to the step S41.

On the other hand, in a case where all the classification rule L=>R has been processed, the classification rule generator 23 constructs a classification rule candidate set F by the sets $F_{L=>R}$ and $F_\Phi$, and stores the data of the classification rule candidate set F into the processing result data storage 19 (step S49).

Moreover, the classification rule generator 23 calculates an appearance frequency score (v) of the feature element (keyword) v included in the classification rule candidate set F from the correct answer data DB 9 and stores the calculated score (v) into a storage device (step S51). For example, the appearance frequency is calculated for the keywords such as "Bulgaria", "Oil", and "Jam".

Then, the classification rule generator 23 identifies one feature pattern p=>c included in the classification rule candidate set F (step S53), and calculates Score (p=>c)=$\Sigma_p$ score(v) (step S55). In this step, summation of the score (v) of the keywords included in the pattern p is calculated. And then, it judges whether or not all the feature patterns in the classification rule candidate set F have been processed (step S57). If there is any unprocessed feature pattern, the processing returns to the step S53. On the other hand, in a case where all the feature patterns in the classification rule candidate set F have been processed, it sorts the feature patterns in the classification rule candidate set F according to values of the Score (p=>c), and stores the result into the processing result data storage 19 (step S59). Then, the processing returns to the original processing.

Thus, the negation of the rule and the prioritization to the feature patterns in the classification rule candidate set F are carried out. Incidentally, in the processing flow in FIG. 11, the negation of the rule is carried out only for the feature patterns corresponding to the contrary patterns, because a feature patterns selected by a user in the subsequent processing is the feature pattern corresponding to the contrary pattern.

Figure 11:
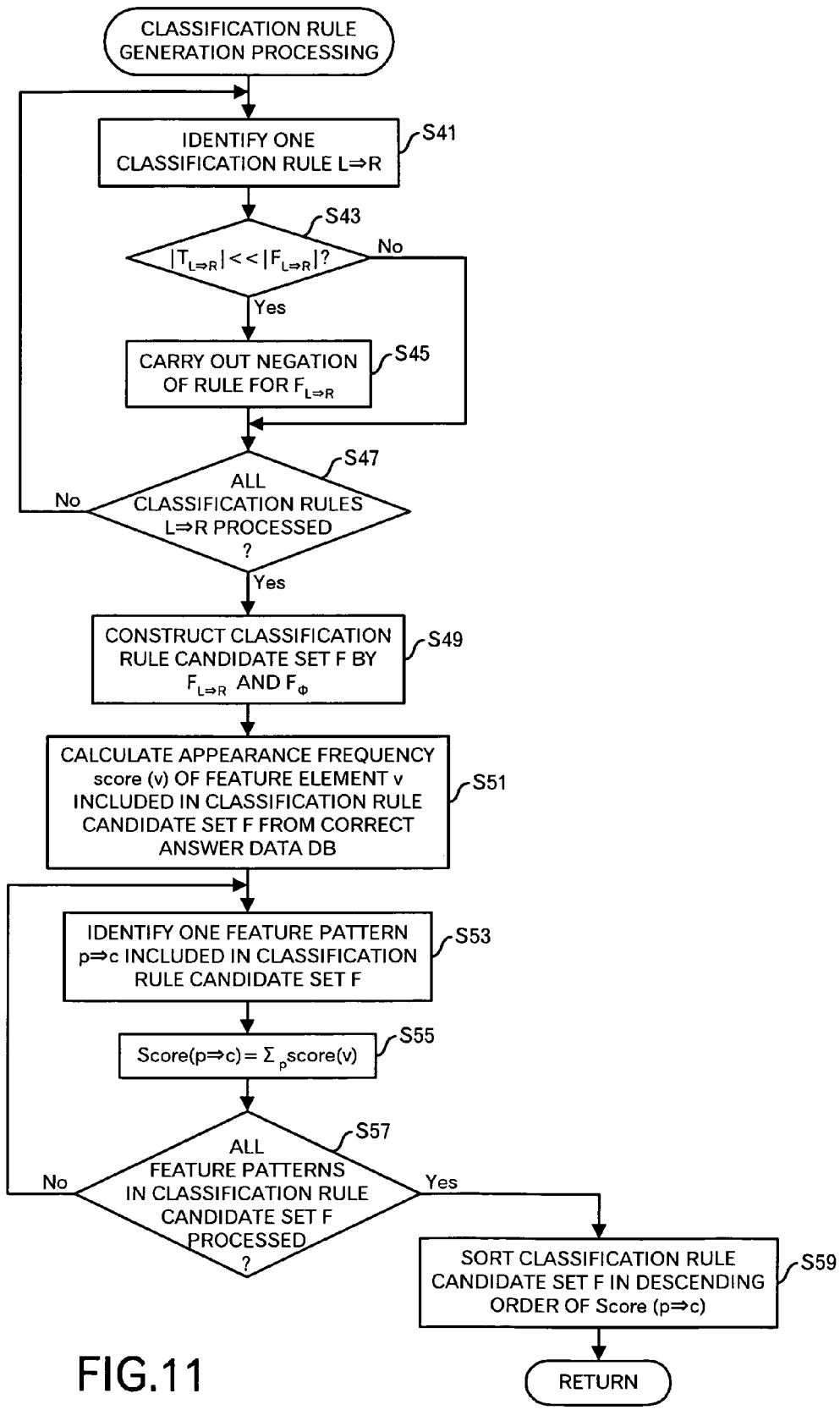
FIG. 11 is a diagram showing a first example of a flow chart of a classification rule generation processing.
Figure 12:
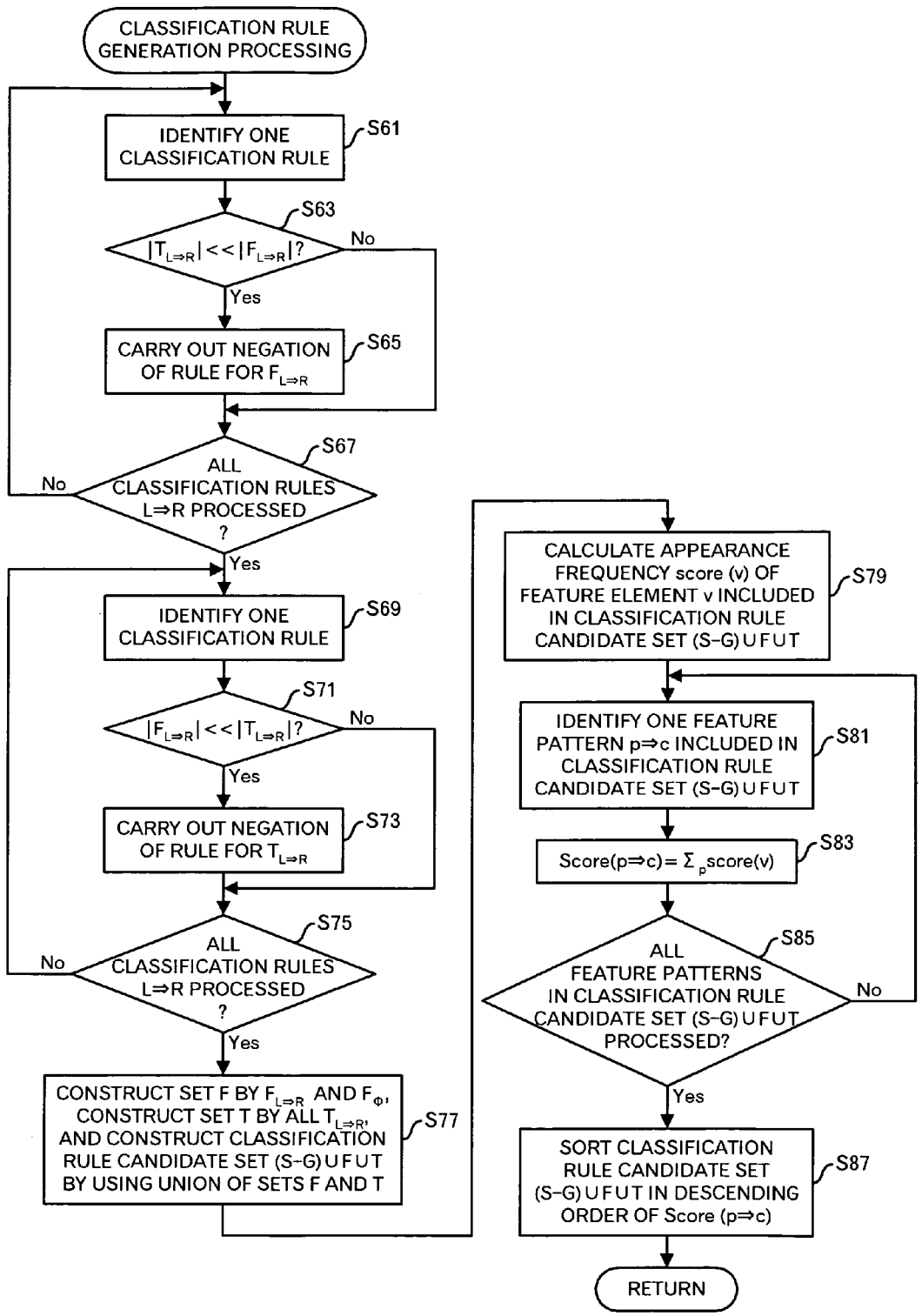
FIG. 12 is a diagram showing a second example of a flow chart of the classification rule generation processing.

Incidentally, a processing shown in FIG. 12, not in FIG. 11, can be carried out as the classification rule generation processing. That is, the classification rule generator 23 identifies one classification rule L=>R based on the data stored in the processing result data storage 19 (step S61). Then, it identifies feature patterns included in the set $T_{L=>R}$ and the set $F_{L=>R}$ corresponding to the classification rule L=>R in the processing result data storage 19, and judges whether or not $|T_{L=>R}|<<|F_{L=>R}|$ is satisfied (step S63).

In a case where the condition of $|T_{L=>R}|<<|F_{L=>R}|$ is satisfied, the classification rule generator 23 carries out the negation of the rule for the set $F_{L=>R}$ (step S65). On the other hand, in a case where the condition of $|T_{L=>R}|<<|F_{L=>R}|$ is not satisfied, the processing proceeds to the step S67. After the step S65, or in a case where the condition at the step S63 is satisfied, it determines whether or not all the classification rules L=>R have been processed (step S67). If there is any unprocessed classification rule, the processing returns to the step S61.

In a case where all the classification rules L=>R have been processed, the classification rule generator 23 identifies one classification rule L=>R based on the data stored in the processing result data storage 19 (step S69). Then, it identifies feature patterns included in the set $F_{L=>R}$ and the set $T_{L=>R}$ corresponding to the classification rule L=>R in the processing result data storage 19, and judges whether or not $|T_{L=>R}|>>|F_{L=>R}|$ is satisfied (step S71).

In a case where the condition of $|T_{L=>R}|>>|F_{L=>R}|$ is satisfied, the classification rule generator 23 carries out the negation of the rule for the set $T_{L=>R}$ (step S73). In the second example described above, the set $T_{L=>R}$ includes a feature pattern composed of keywords "English" AND "Learning" and a correct category "Dictionary/Translation", a feature pattern composed of keywords "Learning" AND "Electronic" and a correct category "Dictionary/Translation", a feature pattern composed of keywords "System" AND "Learning" and a correct category "Dictionary/Translation", a feature pattern composed of keywords "Set" AND "Learning" and a correct category "Dictionary/Translation", and a feature pattern composed of keywords "Learning" AND "Dictionary" and a correct category "Dictionary/Translation". On the other hand, the corresponding set $F_{L=>R}$ includes a feature pattern composed of keywords "English conversation" AND "Learning" and a correct category "Education". Accordingly, the keyword "Learning" is shared, but in a case where the keyword "English conversation" is further included, the correct category becomes "Education". Therefore, by negating the "English conversation", the set $T_{L=>R}$ is changed to a set including a feature pattern composed of keywords "Learning" AND "¬English conversation" and a correct category "Dictionary/Translation". The set $T_{Learning=>Dictionary/Translation}$ shown in FIG. 10 included five feature patterns, but the set $T_{Learning=>Dictionary/Translation}$ is replaced with a newly generated feature pattern set by carrying but the negation of the rule.

On the other hand, if the condition of $|T_{L=>R}|>>|F_{L=>R}|$ is not satisfied, the processing shifts to step S75. After the step S73, or in a case where the condition at the step S71 is satisfied, the classification rule 23 judges whether or not all the classification rule L=>R have been processed (step S75). If there is any unprocessed classification rule, the processing returns to the step S69.

In the case that all the classification rules L=>R have been processed, the classification rule generator 23 constructs a classification rule candidate set F by the sets $F_{L=>R}$ and $F_\Phi$, constructs a classification rule candidate set T by all the sets $T_{L=>R}$, constructs a classification rule candidate set (S−G) by excluding a set G including all the conflict rules from a set S including all the existing classification rules, constructs a classification rule candidate set (S−G)∪F∪T, which is a union of the set F, the set T and the set (S−G), and stores data of the classification rule candidate set (S−G)∪F∪T into the processing result data storage 19 (step S77). Incidentally, the classification rule candidate set F, the classification rule candidate set T, and the set G are defined as follows. In addition, as described above, the set $F_\Phi$ is included in the classification rule candidate set F.

$$F = \bigcup_{L \Rightarrow R} F_{L \Rightarrow R}$$

$$T = \bigcup_{L \Rightarrow R} T_{L \Rightarrow R}$$

$$G = \bigcup_{L \Rightarrow R} S(p)$$

In addition, the classification rule generator 23 calculates an appearance frequency score (v) for each of the feature elements (keywords) v included in the classification rule candidate set (S−G)∪F∪T from the correct answer data DB 9, and stores the scores (v) into the storage device (step S79).

Then, the classification rule generator 23 identifies one feature pattern p=>c included in the classification rule candidate set (S−G)∪F∪T (step S81). Next, it calculates Score (p=>c)=$\Sigma_p$ score (v), and stores the calculation result into the processing result data storage 19 in association with the identified feature pattern p=>c (step S83). In the step S83, it calculates the summation of the score(v) of the keywords included in the pattern p. Then, it judges whether or not all the feature patterns in the classification rule candidate set (S−G)∪F∪T have been processed (step S85). If there is any unprocessed feature pattern in the classification rule candidate set (S−G)∪F∪T, the processing returns to the step S81. In a case where all the feature patterns in the classification rule candidate set (S−G)∪F∪T have been processed, it sorts all the feature patterns in the classification rule candidate set (S−G)∪F∪T according to the Score (p=>c), and store the sorting result into the processing result data storage 19 (step S87). And then, the processing returns to the original processing.

Thus, the negation of the rule and the prioritization to the feature patterns in the classification rule candidate set (S−G)∪F∪T are carried out. Incidentally, in the processing flow in FIG. 12, the negation of the rule is carried out only for the feature patterns corresponding to the contrary patterns and the consistent patterns, because feature patterns to be registered in the classification rule DB 11 in the subsequent processing are the feature patterns corresponding to the contrary patterns or the consistent patterns.

In the examples of FIG. 11 and FIG. 12, the feature patterns included in the set $F_{\Phi}$ and the set $F_{L=>R}$ are sorted, but the priority may be given to the feature patterns in the set $F_{L=>R}$.

Returning to the explanation of FIG. 4, next, the classification rule registration processor 21 registers the classification rules by using the processing result data storage 19, and updates the classification rule DB 11 (step S11). This processing will be described with FIGS. 13 to 16 in detail.

Figure 13:
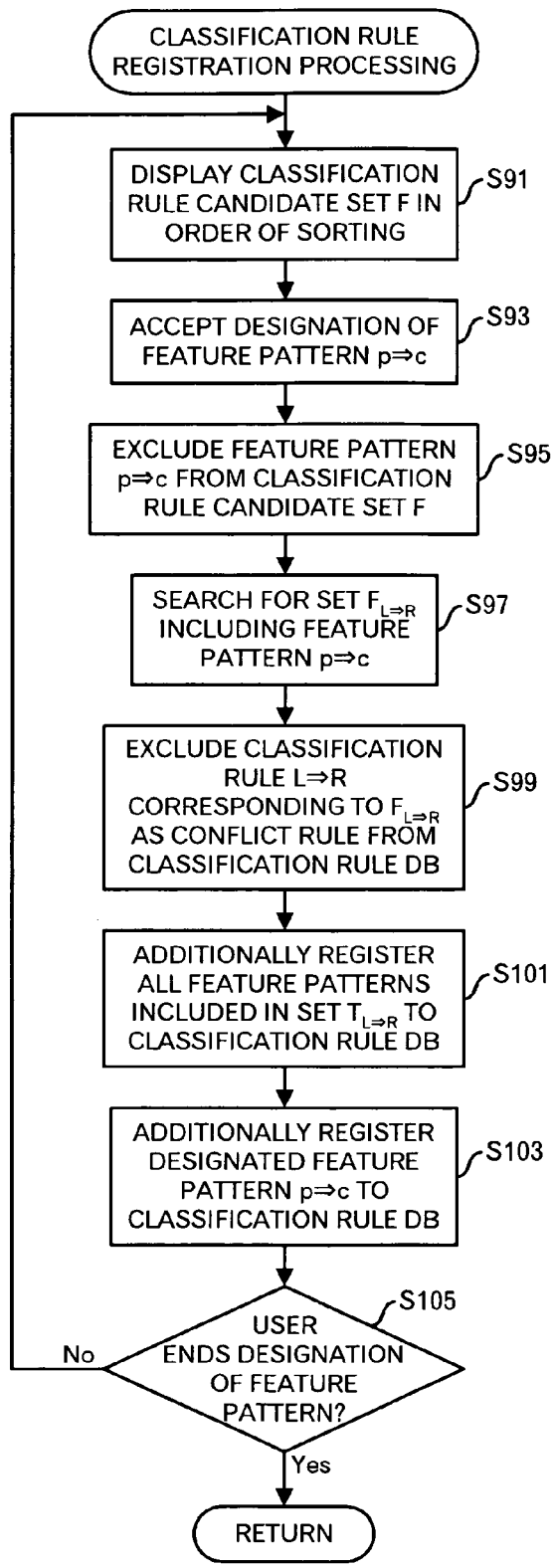
FIG. 13 is a diagram showing a first example of a flow chart of a classification rule registration processing.

FIG. 13 shows the first example of the classification rule registration processing. This processing is carried out after the processing shown in FIG. 11. However, the step S41 to step S47 can be omitted. The classification rule registration processor 21 lists the feature patterns of the classification rule candidate set F stored in the processing result data storage 19 in sorted order based on the Score (p=>c), and displays them on a display device to prompt the user to select any feature patterns (step S91). In the first example described above, the feature pattern composed of the keywords "Jam" AND "Smell" and the correct category "Jam", the feature pattern composed of the keywords "Jam" AND "Rose" and the correct category "Jam", the feature pattern composed of the keywords "You" AND "Bloom" and the correct category "Jam", the feature pattern composed of the keywords "You" and "Jam" and the correct category "Jam", the feature pattern composed of the keywords "Jam" AND "Bloom" and the correct category "Jam", the feature pattern composed of the keywords "You" AND "Smell" and the correct category 'Jam', the feature pattern composed of the keywords "Jam" AND "Smell" and the correct category "Jam", the feature pattern composed of the keywords "Bulgaria" AND "¬Oil" and the correct category "Jam", and the feature pattern composed of the keywords "Bloom", "Rose", and "Smell" and the correct category "Jam" are listed. The user selects feature patterns to be registered in the classification rule DB 11 among the listed feature patterns.

Then, the classification rule registration processor 21 accepts the selection of the feature pattern p=>c from the user (step S93). Next, it excludes the selected feature pattern p=>c from the classification rule candidate set F in the processing result data storage 19 (step S95). In addition, it searches the processing result data storage 19 for the set $F_{L=>R}$ including the selected feature pattern p=>c (step S97). Then, it identifies the classification rule L=>R corresponding to the set $F_{L=>R}$, and excludes the classification rule L=>R as the conflict rule from the classification rule DB 11 (step S99). Incidentally, in a case where the classification rule L=>R is already excluded from the classification rule DB 11, the step S99 is skipped. In addition, in a case where the feature pattern is selected from the set $F_{\Phi}$, because the corresponding classification rule L=>R does not exist, the step S99 is skipped.

In addition, the classification rule registration processor 21 additionally registers all feature patterns included in the corresponding set $T_{L=>R}$ in the classification rule DB 11 (step S101) This step S101 is also skipped when the feature pattern is already registered. In a case where the feature pattern is selected from the set $F_{\Phi}$, the step S101 is skipped, because the corresponding $T_{L=>R}$ does not exist. Furthermore, it additionally registers the selected feature pattern p=>c in the classification rule DB 11 (step S103).

For example, in the first example described above, when the feature pattern composed of the keywords "Bulgaria" AND "¬Oil" and the correct category "Jam" is selected, this feature pattern is additionally registered in the classification rule DB 11, and the classification rule including the condition part "Bulgaria" and the concluding part "Aroma" is excluded from the classification rule DB 11. Moreover, the feature pattern composed of the keywords "Oil" AND "Bulgaria" and the correct category "Aroma" is additionally registered in the classification rule DB 11.

After that, the classification rule registration processor 21 judges whether or not the user instructs to terminate the selection of the feature pattern (step S105). If the user does not instruct to terminate the selection of the feature pattern, the processing returns to the step S91. On the other hand, when the user instructs to terminate the selection of the feature pattern, the processing returns to the original processing.

Thus, the feature patterns the user considers necessary among the feature patterns related to the contrary pattern are added to the classification rule DB 11, the already registered classification rule, which causes the conflict, is excluded, and the feature patterns related to the corresponding consistent pattern are added. Accordingly, when adding the new product, the classification rule DB 11 can be updated without the prioritization of the classification rules and without causing the conflict.

Incidentally, although it is not shown in FIG. 13, the product name and the correct category of the new product are registered in the correct answer data DB 9.

Figure 14:
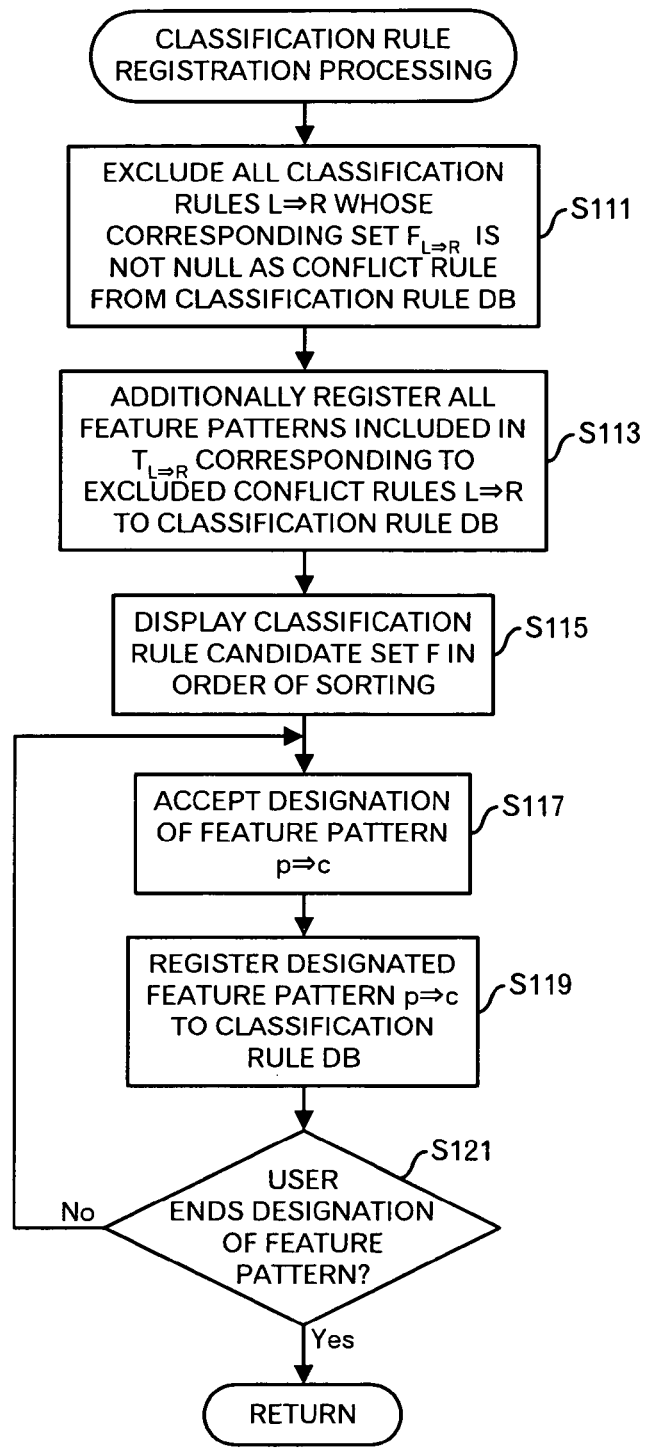
FIG. 14 is a diagram showing a second example of a flow chart of the classification rule registration processing.

In addition, after the processing in FIG. 11, a processing shown in FIG. 14 can be performed. However, the step S41 to the step S47 can be omitted in FIG. 11. That is, the classification rule registration processor 21 identifies classification rules L=>R, which are included in the classification rule set S (p), and whose corresponding set $F_{L=>R}$ is not null, in the processing result data storage 19, and excludes all the classification rules L=>R from the classification rule DB 11 (step S111).

Moreover, the classification rule registration processor 21 identifies feature patterns included in the set $T_{L=>R}$ corresponding to the deleted conflict rules L=>R, in the processing result data storage 19, and additionally registers all the identified feature patterns in the classification rule DB 11 (step S113).

After that, the classification rule registration processor 21 lists the feature patterns of the classification rule candidate set F stored in the processing result data storage 19 according to the sorted order based on the Score (p=>c), and displays the list to prompt the user to select any feature patterns on the display device (step S115). Then, it accepts the selection of the feature pattern p=>c from the user (step S117), and additionally registers the selected feature pattern p=>c in the classification rule DB 11 (step S119).

And then, the classification rule registration processor 21 judges whether or not the user instructs to terminate the selection of the feature pattern (step S121). If the user does not instruct to terminate the selection of the feature pattern, the processing returns to the step S117. On the other hand, when the user instructs to terminate the selection of the feature pattern, the processing returns to the original processing.

Thus, the classification rules causing the inconsistency are excluded, the feature patterns, which are related to the consistent pattern and become necessary as the result of the exclusion, are added, and the feature pattern related to the contrary pattern is registered according to the instruction of the user. Carrying out such a processing also makes it possible to accumulate the classification rules capable of treating the new product without carrying out the prioritization to the classification rules in the classification rule DB 11 and without causing the conflict in the classification rule DB 11.

Incidentally, in a case where the selected feature pattern is excluded from the classification rule candidate set F, the processing may return from the step S121 to the step S115.

Figure 15:
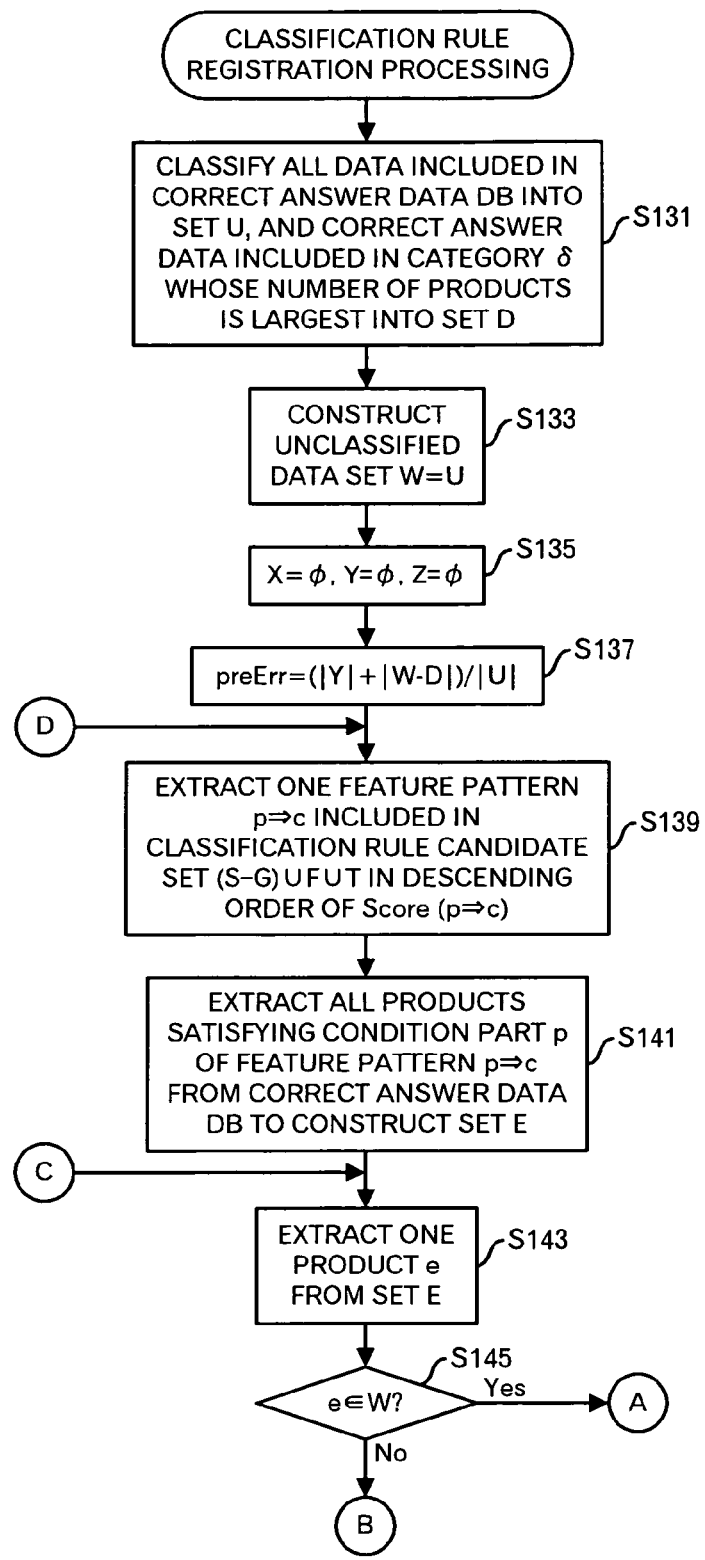
FIG. 15 is a diagram showing a third example of a flow chart of the classification rule registration processing.
Figure 16:
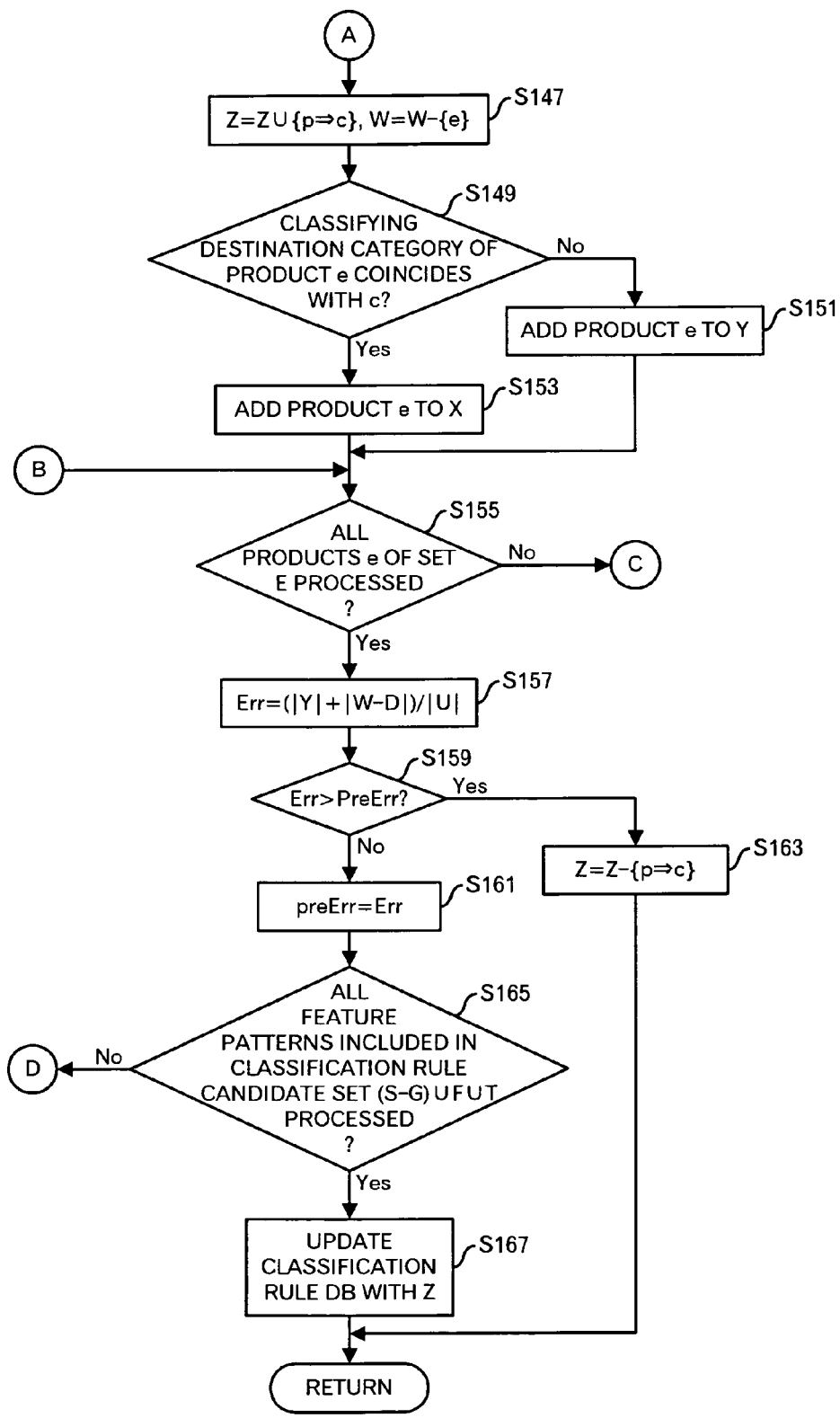
FIG. 16 is a diagram showing the third example of a flow chart of the classification rule registration processing.

Next, the third example of the classification rule registration processing will be explained using FIG. 15 and FIG. 16. This processing is carried out when the classification rule candidate set (S−G)∪F∪T is generated by the processing in FIG. 12. Incidentally, this processing is different from the aforementioned two examples, and is to automatically select the classification rule to be registered in the classification rule DB 11. In addition, the score (i.e. a value of Score) calculated by the processing in FIG. 12 defines the order of this processing.

In the third example, a method to add the classification rule in order of the score is adopted, and when the addition of the classification rule does not contribute to improvement of the accuracy of the rule base, the addition of the rule is terminated. Accordingly, the rule base including rules with the high score and having the maximum accuracy is constructed. First, the classification rule registration processor 21 classifies all the correct answer data included in the correct answer data DB 9 as a set U and the correct answer data included in the category δ whose number of products is the largest as a set D (step S131). In this embodiment, the category δ is determined as a default category, and the data, which is not classified by any rules, are classified into the category δ. In addition, initially, the classification rule registration processor 21 constructs an unclassified data set W (=U) (step S133). The data for these sets is stored into a work memory area. Furthermore, it sets X, Y, Z as X=Φ, Y=Φ, Z=Φ (step S135). X is a set of the products whose classification by the classification rule is correct. Y is a set of the products whose classification by the classification rule is wrong. Z is a set of the classification rules being generated from now. X∪Y means a set of classified products.

In addition, the classification rule registration processor 21 calculates preErr=(|Y|+|W−D|)/|U|, and stores the calculation result into the storage (step S137). |Y| represents the number of elements (size) included in the set Y. Similarly, |W−D| represents the number of elements included in a difference set W−D between the set W and the set D, and |U| represents the number of elements in the set U. Incidentally, the preErr calculated in this step is an initial error rate in an assumption that the products not included in the category δ are misclassified, because Y=Φ.

Next, the classification rule registration processor 21 extracts one feature pattern p=>c, which is included in the classification rule candidate set (S−G)∪F∪T and stored in the processing result data storage 19, in descending order of Score (p=>c) (step S139). Then, it extracts all products satisfying the condition part p of the feature pattern p=>c extracted at the step S139 from the correct answer data DB 9, and constructs a set E by the extracted products (step S141). Data of the set E is stored in the work memory area, for example.

Furthermore, the classification rule registration processor 21 extracts one product e from the set E (step S143), and determines whether or not e∈E is satisfied (step S145). That is, it is determined whether the product e is already classified by the added classified rules. In the case that the product e is not included in the set W of the unclassified data, the processing shifts to the step S155 in FIG. 16 through a terminal B. In the case that the product e is included in the set W of the unclassified data, the processing shifts to step S147 in FIG. 16 through a terminal A.

Then, the classification rule registration processor 21 adds the feature pattern p=>c extracted at the step S139 to a set Z (Z=Z∪{p=>c}), and removes the product e from the set W of the unclassified data (W=W−{e}) (step S147). Because the order of additionally registering the feature pattern in the set Z accords with the priority, the order is maintained also in the set Z. In addition, it judges whether a classifying destination category of the product e by the feature pattern p=>c extracted at the step S139 matches with the original classifying destination category c (step S149). If the classifying destination category of the product e by the feature pattern p=>c extracted at the step S139 does not match with the original classifying destination category c, because it is misclassification, it adds the product e to the set Y (step S151). In a case where the classifying destination category of the product e by the feature pattern p=>c extracted at the step S139 matches with the original classifying destination category c, because the feature pattern classifies the product into the correct category, it adds the product e to the set X (step S153).

After that, the classification rule registration processor 21 judges whether or not all products e in the set E have been processed (step S155). If any unprocessed product e exists in the set E, the processing returns to the step S143 in FIG. 15 through a terminal C. In a case where the unprocessed product e does not exist in the set E, it calculates the error rate Err=(|Y|+|W−D|)/|U|, and stores the error rate Err into the storage device (step S157). Incidentally, a product included in the set W may be included in the set D, and a product included in the set E may be included in the set D. Therefore, by processing the set E, the decrease of |W−D| may be less than the increase amount of |Y|, though |Y| increases. For example, even when the product e is excluded from the set W, in a case where the product e is included in the set D, the number of products included in the difference set W−D between the set W and the set D does not decrease.

Then, the classification rule registration processor 21 judges whether Err>PreErr is satisfied (step S159). In a case where Err is larger than PreErr, it removes the feature pattern p=>c identified at the step S139 from the set Z (step S163). And then, the processing returns to the original processing. In a case where Err is less than PreErr, it sets PreErr=Err (step S161). And then, it judges whether all the feature patterns included in the classification rule candidate set (S−G)∪F∪T have been processed (step S165). If any unprocessed pattern exists, the processing returns to the step S139 through a terminal D.

Thus, the feature patterns are added to the set Z as the classification rule, until the error rate increases. Then, when it is judged at the step S165 that all the feature patterns included in the classification rule candidate set (S−G)∪F∪T have been processed, the classification rule registration processor 21 updates the classification rule DB 11 by the set Z (step S167).

By carrying out the aforementioned processing, the classification rule capable of appropriately treating the new product can be created.

Although the embodiment of the present invention has been explained above, the present invention is not limited to the aforementioned embodiments. In the explanation, the processing flow including the negation of the rule was described, but it does not always have to carry out the negation of the rule. In a case where the negation of the rule is not carried out, the processing for generating the conflict resolution table may be omitted, for example, for FIG. 15 and FIG. 16.

In addition, the function blocks in FIG. 1 do not always correspond to real program modules, respectively.

Moreover, as described above, the apparatus for supporting creation of classification rules can be configured in a stand-alone style, or can be configured to implement the aforementioned functions by one or plural servers and register data of the new product by terminals connected via a network.

Figure 17:
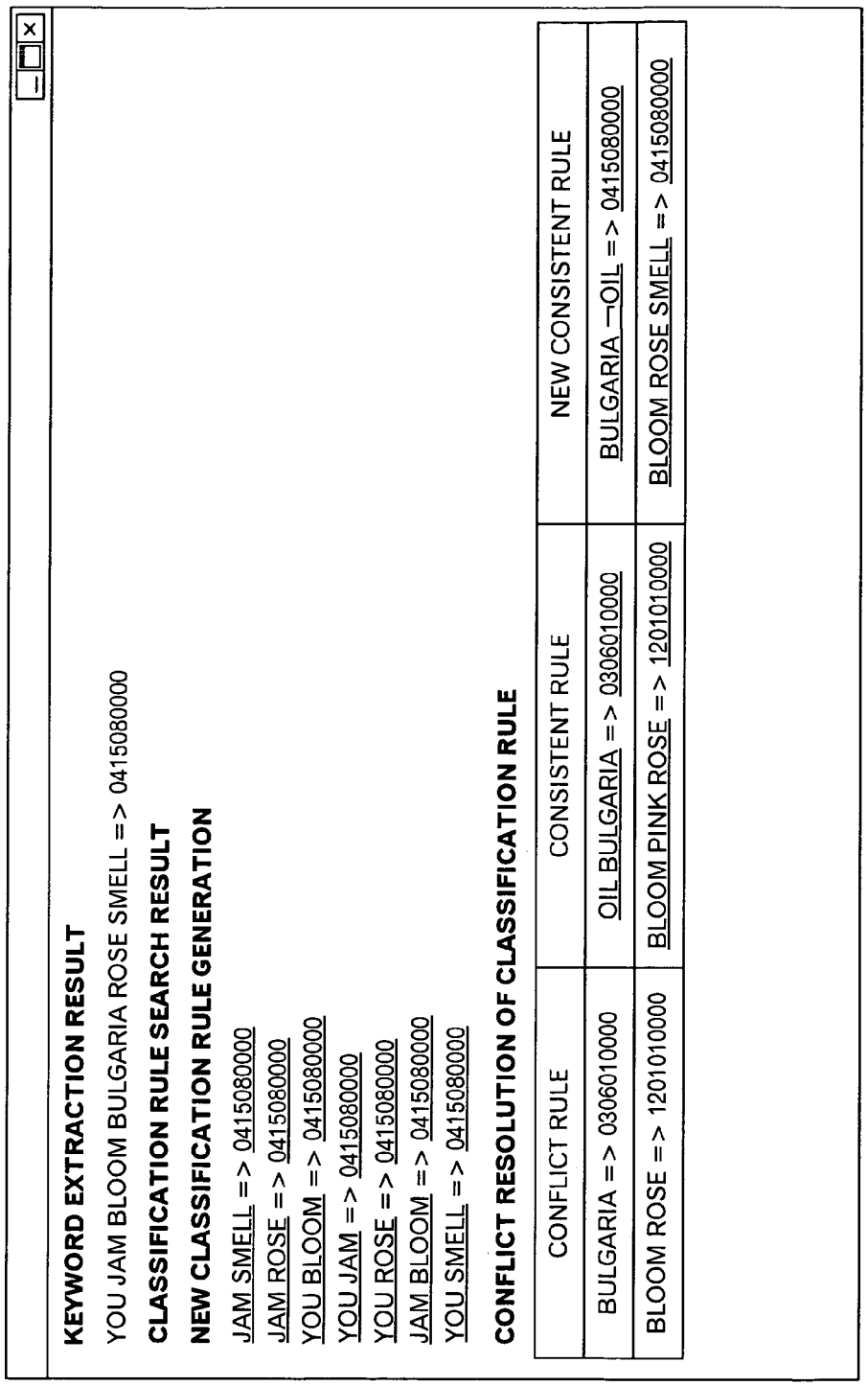
FIG. 17 is a diagram showing another example of a screen displayed in the first and second examples of a classification rule registration processing.

Moreover, a screen presented to the user in FIG. 13 and FIG. 14 can be one shown in FIG. 17. In the explanation of FIG. 13 and FIG. 14, the keywords are enumerated according to values of the Score. However, as shown in FIG. 17, the screen can be configured to include the "keyword extraction result", which represents the result of the word or phrase separation or the morphological analysis for the product names of the new products, codes of the correct categories, the classification rule search result (it does not exist in this example), which is the search result of the rules capable of correctly classifying the product name of the new product in the classification rule DB 11, the set $F_\Phi$ (generation of new classification rules), and a conflict resolution table excepting for the set $F_\Phi$. In this case, the user clicks rules to be registered in the classification rule DB 11 to make this system register them in the classification rule DB 11.

Figure 18:
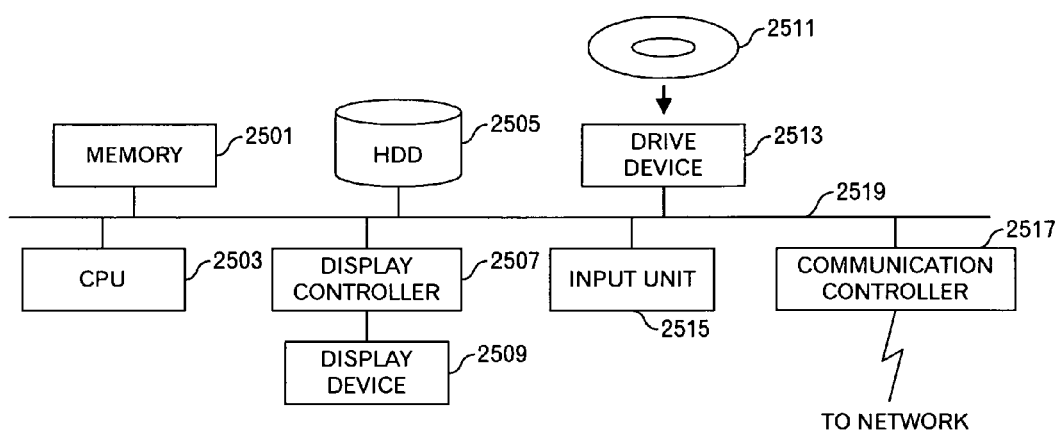
FIG. 18 is a diagram showing a computer system.

In addition, the apparatus for supporting creation of classification rules is a computer device as shown in FIG. 18. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method for supporting creation of a classification rule, comprising:

first extracting, by a processor of a computer that accesses a correct answer data storage unit storing correct answers each including a data item and a corresponding first correct category of the data item, and a classification rule storage unit storing classification rules each including a condition part that includes at least one keyword and a corresponding second category, a plurality of feature patterns from the correct answer data storage unit, wherein each of the plurality of feature patterns includes at least one feature element included in a new data item inputted by a user and a first correct category corresponding to a data item including the at least one feature element;

second extracting, by the processor, one or plural classification rules whose condition part satisfies the new data item from the classification rule storage unit;

grouping, by the processor, the plurality of feature patterns into a first group of feature patterns that are satisfied with a condition part of one classification rule included in the one or plural classification rules extracted in the second extracting and have a first correct category different from a second category of the one classification rule, a second group of feature patterns that are satisfied with the condition part of the one classification rule and have a first correct category identical to the second category of the one classification rule, and a third group of feature patterns that are not satisfied with the condition part of each of the one or plural classification rules extracted in the second extracting; and outputting, by the processor, data of the first group in association with the one classification rule, data of the second group in association with the one classification rule and data of the third group in association with data representing that no condition parts of the one or plural classification rules satisfy feature patterns included in the third group.

2. The method as set forth in claim 1, further comprising:

registering, by the processor, a selected feature pattern of the feature patterns included in the first group and a second feature pattern that is included in the second group and is satisfied with a condition part of a classification rule, which satisfies the selected feature pattern, into the classification rule storage unit; and removing, by the processor, the classification rule whose condition part satisfies the selected feature pattern and the second feature pattern from the classification rule storage unit.

3. The method as set forth in claim 2, further comprising:

registering, by the processor, a feature pattern selected by a user among the feature patterns included in the third group into the classification rule storage unit.

4. The method as set forth in claim 1, further comprising:

calculating, by the processor, a score of each of the feature patterns extracted in the second extracting based on feature elements of each of the feature patterns extracted in the second extracting; and registering, by the processor, a feature pattern extracted in the second extracting one by one into the classification rule storage unit as a new classification rule in descending order of the score of the feature pattern, until an error rate, which changes according to the number of occurrences that data items stored in the correct answer data storage unit are misclassified, increases.

5. The method as set forth in claim 1, further comprising:
detecting, by the processor, that the number of feature patterns included in the first group satisfies a condition concerning the number of feature patterns included in the second group; and
upon the detecting, changing, by the processor, a condition of the feature patterns included in the first group to a condition including a negative rule.

6. The method as set forth in claim 1, further comprising:
first detecting, by the processor, that the number of feature patterns included in the first group satisfies a condition concerning the number of feature patterns included in the second group;
upon the first detecting, changing, by the processor, a condition of the feature patterns included in the first group to a condition including a negative rule;
second detecting, by the processor, that the number of feature patterns included in the second group satisfies a condition concerning the number of feature patterns included in the first group; and
upon the second detecting, changing, by the processor, a condition of the feature patterns included in the second group to a condition including a negative rule.

7. The method as set forth in claim 1, further comprising:
presenting, by the processor, the user with the feature patterns included in the first group;
accepting, by the processor, selection of a feature pattern from the user;
registering the selected feature pattern into the classification rule storage unit;
identifying, by the processor, a second feature pattern that is included in the second group and is satisfied with a condition part of a classification rule, which satisfies the selected feature pattern,
registering, by the processor, the second feature pattern into the classification rule storage unit; and
removing, by the processor, the classification rule whose condition part satisfies the selected feature pattern and the second feature pattern from the classification rule storage unit.

8. The method as set forth in claim 1, further comprising:
removing a specific classification rule whose condition part satisfies the feature pattern included in the first group and in the second group from the classification rule storage unit;
registering the feature patterns that are included in the second group and are associated with the specific classification rule into the classification rule storage unit;
presenting the user with the feature patterns included in the first group and the third group;
accepting selection of a feature pattern from the user; and
registering the selected feature pattern into the classification rule storage unit.

9. A computer-readable, non-transitory storage medium storing a program for causing a computer to execute a procedure comprising:
first extracting, from a correct answer data storage unit storing correct answers each including a data item and a corresponding first correct category of the data item, a plurality of feature patterns from the correct answer data storage unit, wherein each of the plurality of feature patterns includes at least one feature element included in a new data item inputted by a user and a first correct category corresponding to a data item including the at least one feature element;
second extracting, from a classification rule storage unit storing classification rules each including a condition part that includes at least one keyword and a corresponding second category, one or plural classification rules whose condition part satisfies the new data item;
grouping the plurality of feature patterns into a first group of feature patterns that are satisfied with a condition part of one classification rule included in the one or plural classification rules extracted in the second extracting and have a first correct category different from a second category of the one classification rule, a second group of feature patterns that are satisfied with the condition part of the one classification rule and have a first correct category identical to the second category of the one classification rule, and a third group of feature patterns that are not satisfied with the condition part of each of the one or plural classification rules extracted in the second extracting; and
outputting data of the first group in association with the one classification rule, data of the second group in association with the one classification rule and data of the third group in association with data representing that no condition parts of the one or plural classification rules satisfy feature patterns included in the third group.

10. An apparatus for supporting creation of a classification rule, comprising:
a correct answer data storage unit storing correct answers each including a data item and a corresponding first correct category of the data item;
a classification rule storage unit storing classification rules each including a condition part that includes at least one keyword and a corresponding second category; and
a processor configured to execute a procedure comprising:
first extracting, from the correct answer data storage unit, a plurality of feature patterns from the correct answer data storage unit, wherein each of the plurality of feature patterns includes at least one feature element included in a new data item inputted by a user and a first correct category corresponding to a data item including the at least one feature element;
second extracting, from the classification rule data storage unit, one or plural classification rules whose condition part satisfies the new data item;
grouping the plurality of feature patterns into a first group of feature patterns that are satisfied with a condition part of one classification rule included in the one or plural classification rules extracted in the second extracting and have a first correct category different from a second category of the one classification rule, a second group of feature patterns that are satisfied with the condition part of the one classification rule and have a first correct category identical to the second category of the one classification rule, and a third group of feature patterns that are not satisfied with the condition part of each of the one or plural classification rules extracted in the second extracting; and
outputting data of the first group in association with the one classification rule, data of the second group in association with the one classification rule and data of the third group in association with data representing that no condition parts of the one or plural classification rules satisfy feature patterns included in the third group.

* * * * *